United States Patent [19]

Margulis

[11] Patent Number: 4,653,218

[45] Date of Patent: Mar. 31, 1987

[54] FISHING LURE PRODUCING OSCILLATORY MOTION, AND UTILIZING DETACHABLE TAIL

[76] Inventor: Howard Margulis, 3466 Colwyn Ct., Orlando, Fla. 32806

[21] Appl. No.: 827,524

[22] Filed: Feb. 10, 1986

[51] Int. Cl.[4] ............................................. A01K 85/06
[52] U.S. Cl. ..................................... 43/26.2; 43/42.2; 43/42.29
[58] Field of Search ................... 43/26.2, 42.19, 26.1, 43/42.29, 42.2, 42.12

[56] References Cited

U.S. PATENT DOCUMENTS

| | | | |
|---|---|---|---|
| 966,068 | 8/1910 | Williamson | 43/26.2 |
| 1,627,512 | 5/1927 | Hughes | 43/26.2 |
| 2,521,852 | 9/1950 | Jones | 43/26.2 |
| 2,691,235 | 10/1954 | Pcola | 43/26.2 |
| 2,788,603 | 4/1957 | Lindemann | 43/26.2 |

Primary Examiner—Gene P. Crosby
Attorney, Agent, or Firm—Julian C. Renfro

[57] ABSTRACT

A lightweight fishing lure comprising an elongate, non-rotative shaft having an attachment portion for a fishline at its front end, and a support for an oscillatory member at its rear end. The oscillatory member has tail mounting means serving to detachably mount a tail, with the support defining an axis essentially perpendicular to the axis of the elongate shaft. The oscillatory member is rotatable for a number of degrees in each direction about the perpendicular axis, and a motion producing member is mounted on the elongate shaft at a location intermediate the ends thereof. An operative connection is formed between the motion producing means and the oscillatory member, so that a tail mounted on the oscillatory member will be caused to undertake a motion closely resembling that of a swimming fish. A weight placed outboard of the axis of rotation of the motion producing member prevents the lure from tending to rotate as a result of the passage of water thereover, and quite advantageously, I make it readily possible for the fisherman to change the amplitude of oscillation of the tail.

20 Claims, 14 Drawing Figures

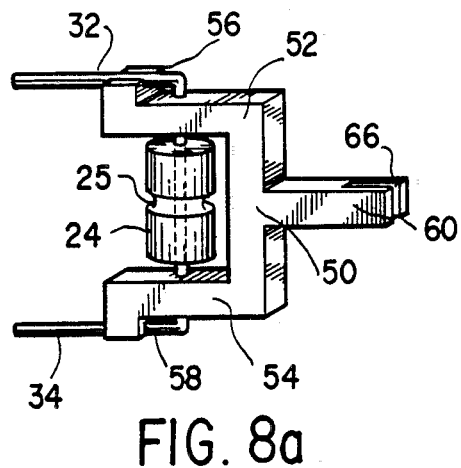
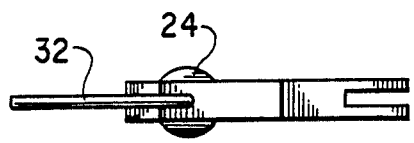
FIG. 8a    FIG. 8b
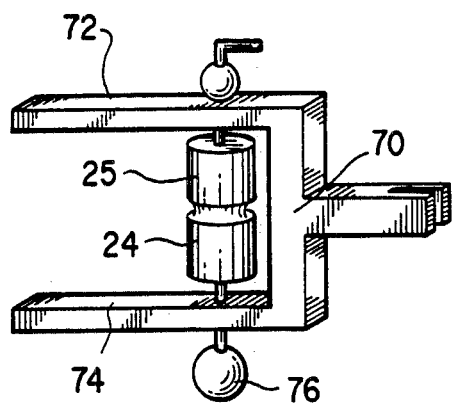
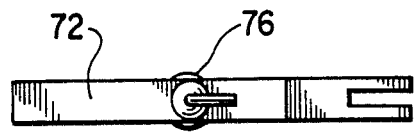
FIG. 9a    FIG. 9b
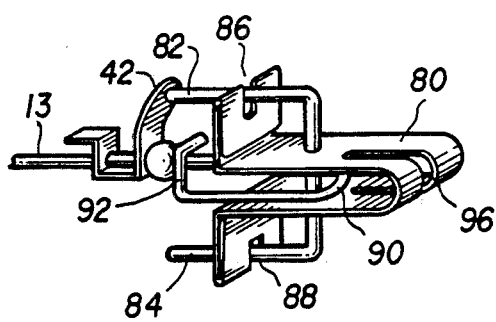
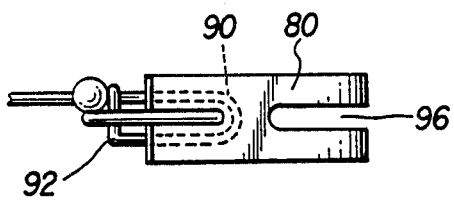
FIG. 10a    FIG. 10b

FISHING LURE PRODUCING OSCILLATORY MOTION, AND UTILIZING DETACHABLE TAIL

BACKGROUND OF THE INVENTION

In the past a number of animated fishing lures have been proposed, offering a variety of motions designed to attract fish. A common ingredient in such prior art devices was the use of a propeller, typically in the front portion of the device that served, when moving through the water, to cause one or more desired motions of the lure.

Some of these devices have been successful, while others have not, with cost and unnecessary complexity being factors that were seemingly overlooked in many of the prior art designs.

My studies have shown that certain organs of fish are quite sensitive to oscillating motions in the water, with the result that out of curiosity or excitement, a fish swims toward a device representing the source of such vibration, and hopefully becomes hooked thereon. Despite the attractiveness of many lures, most fishermen will not continue to use lures that are too difficult to keep in operating order, or that are too awkward to deploy, or too expensive.

Many of the prior art artificial lures have had a cavity of substantial size in the body portion of such device, which created buoyancy problmes that had to be compensated for by the use of weights. As a result, the lure became quite heavy, difficult to operate, and expensive to manufacture and maintain.

It is my belief that the primary factors contributing to the effectiveness of a fishing lure are:
1. Behavior
2. Size
3. Shape
4. Color Inasmuch as a chief food source for most game fish are various species of foraging minnows whose size, shape, and color vary with geography and season of the year, it is one goal of my invention to provide a quick and economical means enabling a fisherman to select a tail of the most auspicious color and configuration, and quickly install same on the lure. As a result, the lure can be caused to closely resemble the natural prey of selected game fish, and present it with an oscillating motion that closely simulates the undulating behavior of a live minnow or small fish.

Accordingly, it is a goal to evolve a fishing lure that will prove highly satisfactory in every regard, and feature an oscillatory, readily detachable tail.

RELATIONSHIP TO EARLIER INVENTION

This invention in some regards bears a close resemblance to my copending patent application entitled "Minimal Weight Fishing Lure Producing Oscillatory Motion, and Utilizing Interchangeable Parts", Ser. No. 587,249, filed Mar. 7, 1984, and now allowed, U.S. Pat. No. 4,569,147. Aspects of that patent application pertinent to the instant invention are hereby incorporated by reference herein.

SUMMARY OF THIS INVENTION

My fishing lure is of the type involving minimal body parts as well as light weight and low buoyancy, entailing the use of an elongate, non rotatable shaft upon which is mounted a suitable rotation producing device, such as a propeller that rotates as a result of water passing thereover. The propeller is connected to provide a desirable and effective oscillatory motion to the tail of the device, with this motion being achieved in a straightforward yet inexpensive manner. Bent wire forms the means by which the structure of the preferred embodiment of this novel lure is defined. In this embodiment, the wire forming the non-rotatable shaft continues aft and is secured to a support member carrying an oscillatory device upon which the tail is detachably carried. The oscillatory motion that is produced by highly effective motion producing means as the lure moves through the water causes the tail to wriggle in a manner closely resembling the action of an aquatic animal, such as a fish or the like.

The fish hook may be carried in the tail, or instead carried on a wire leader extending outboard of the propeller, and aft thereof. Upon a fish seizing the hook, the tail is arranged to break away, so that the fish is connected by a drop line directly to the principal portion, i.e. the body portion of the lure. Advantageously, the stress created by the struggling fish is therefore not transmitted to the fishline and the fishing pole through the oscillatory members or components of my device, as would have been the case if the tail did not detach. Rather, the components constituting the oscillatory members are isolated from this stress by the detaching of the tail, which obviously means that considerably lighter materials could be utilized in the construction of the oxcillatory members, than would have otherwise been possible. This in turn means that the desired wrigging motions can be made more effectively than if I was limited to the use of heavier materials.

My simplified yet highly advantageous arrangement offers a number of options to the fisherman, including the option of him being able to modify the amplitude of the oscillation of the detachable tail should such become desirable.

Importantly, the construction of my lure also permits the fisherman to select the depth at which the lure operates, and such is made possible by the fisherman being able to place a weight of the appropriate size on the weight carrying portion of my device. Such weight also serves as a counterweight to prevent the principal or body portion of the lure from rotating as the lure moves through the water with its motion producing means rotating.

As mentioned above, my lure utilizes a readily releasable tail construction, and this in turn makes it possible for the fisherman to select a tail (or hook and tail) that is appropriate in each instance, taking into consideration size, texture, color and the like, as may be appropriate for particular types of fish. Multiple tails, each using a respective hook, could also be utilized in accordance with this invention.

As should now be apparent, my lure is versatile in many degrees, and affords a fisherman the opportunity to closely control the behavior of the lure, as may be appropriate for a given circumstance, with this being achieved in a device that is inexpensive to manufacture, simple to keep in working order, and a sheer delight to use.

It is therefore a principal object of my invention to provide a fishing lure of inexpensive construction that affords a sport fisherman the maximum degree of control over the behavior and appearance of the lure.

It is another object of my invention to provide a fish lure characterized by its simplicity of construction and operation, yet affording the fisherman close control of the oscillatory action of the lure.

It is still another object of my invention to provide a fishing lure featuring a realistic wriggling motion that has proven very attractive to sport fish, in combination with a detachable tail that can be quickly replaced with another and differently configured tail by the fisherman should the occasion arise.

It is yet another object of my invention to provide a detachable tail fishing lure deriving a highly effective oscillatory motion with the use of a minimum number of components and a readily releasable tail.

It is yet still another object of my invention to provide a fishing lure of low weight and low buoyancy, in which a highly effective oscillatory device is integrated into the lure, with the struggling of the hooked fish being in effect divorced from the oscillatory device, to prevent any impairment of the components or parts associated with the creation of the oscillatory motion.

BRIEF DESCRIPTION OF DRAWINGS

FIGS. 8a and 8b represent another embodiment of my novel oscillatory member, wherein the body is of molded plastic or the like, whereas the forwardly extending components that interact with a rotating component to bring about the desired oscillation are in this instance of wire.

FIGS. 9a and 9b represent still another embodiment of my novel oscillatory member, in which the entire body portion is of molded plastic or lightweight metal, with the forwardly extending components being integral with the rearward part of this member; and FIGS. 10a and 10b represent yet another embodiment of my novel oscillatory member, in which the principal part of the body portion of this member is of bent strip, and in the rearmost part of the body portion is defined a slot in which the detachable tail can be readily and effectively mounted.

DETAILED DESCRIPTION

Figure 1:
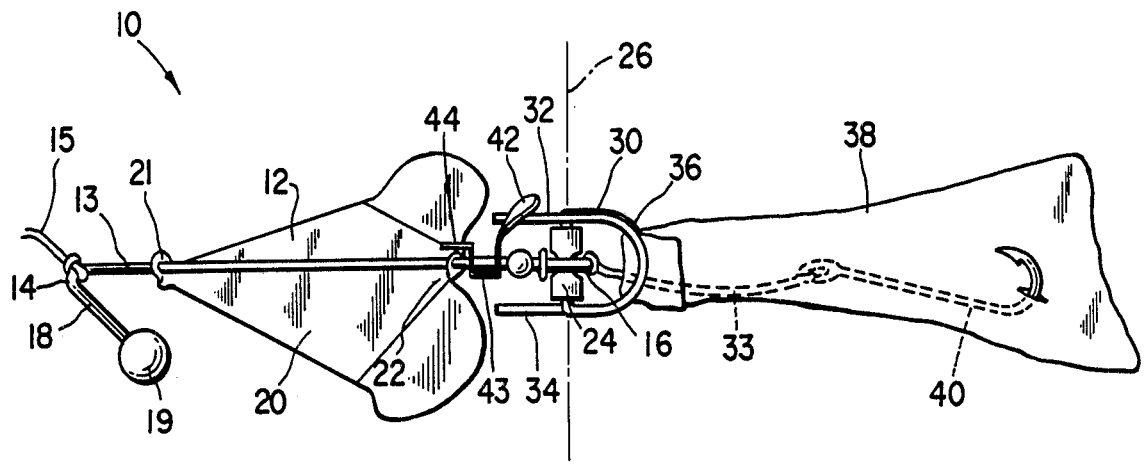
FIG. 1 is a side elevational view of a preferred embodiment of a lightweight fishing lure in accordance with this invention, in which the fish hook is placed in the oscillatory, detachable tail, and the counterweight utilized to prevent undesirable rotation of the lure body being placed forwardly.

Referring to FIG. 1, it will be seen that the lightweight lure 10 in accordance with this invention principally involves an elongate, non-rotatable shaft 12 constructed out of a short length of wire 13. The shaft 12 has a front end 14 serving as an attachment means for a fishline 15, and a rear end 16 that includes a support 24, and that also defines the location where the drop line 33 carrying the fish hook 40 is attached. Support 24 is a generally cylindrically shaped member of plastic, metal, wood, or some other suitable material, which support member is configured to define an axis 26 that is essentially perpendicular to the axis of the elongate shaft 12, and it is about axis 26 that the oscillatory member 30 provided in accordance with this invention is rotatable for a limited number of degrees in each direction. I prefer for the axis 26 to remain substantially vertical during usage of my lure, and this is accomplished by the use of a properly placed counterweight, weight 19 in this instance, as will be discussed in some detail hereinafter.

It is to be understood that I am not, however, limited to using a support that is cylindrically shaped, or that is of one piece construction.

Figure 5:
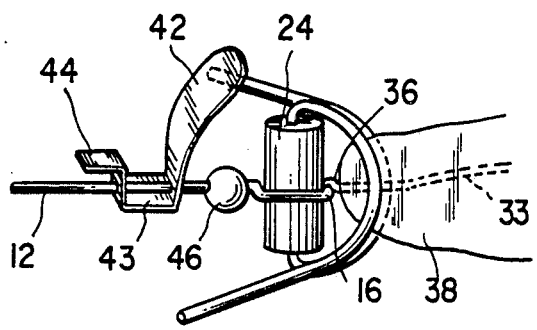
FIG. 5 is an enlarged view of the detail of the preferred construction I utilize in order for the propeller rotation to cause the oscillatory member to oscillate.

The support 24 in the illustrated instance is equipped with a hole extending therethrough on its longitudinal centerline, and this component may be secured to the shaft 12 by twisting the rear end of the shaft about the midportion of the support 24, as best seen in FIG. 5, but I am obviously not to be limited to this particular arrangement. It is at the rear part 16 of the twist of wire 13 that the drop line 33 for the hook is attached. As a result, upon the hooking of a fish, the stress imposed upon the lure by his struggles is directly connected to the body or principal portion of the lure, rather than through the portions of the lure concerned with bringing about oscillations, as would have been the case if the tail had not detached. This is important, for it prevents a possible undesired deformation of the components and parts constituting the oscillatory producing members of the lure.

The oscillatory member 30 of this preferred embodiment may be made of a wire bent to define a means 36 for detachably supporting a tail member 38, as well as to form an operative connection between the tail mounting device and the preferred rotation producing means. I prefer for tail 38 to be of comparatively soft, pliable material, and for example, the tail may be of rubber, plastic, pork rind, or any other suitable material that can be caused to wriggle in a manner resembling a swimming fish. As will be discussed at length hereinafter, the tail 38 may carry a fish hook 40, or the hook may be carried at a location alongside the tail. In the embodiment illustrated in FIGS. 1 and 2, the hook 30 is attached to a drop line or leader 33 that is tied to the rear end 16 of the wire 13 that forms the shaft 12, whereas in the embodiment of FIG. 3, it will be noted that the hook is attached to a wire 17 representing a continuation of the wire 13 from which the shaft 12 was created.

The rotation producing means I prefer to utilize for causing the tail 38 to oscillate as the lure moves through the water may be a propeller 20 provided with fore and aft tabs 21 and 22 mounted in its central axis. Suitable mounting holes are located in these tabs, as shown in FIG. 1, such that the propeller can be rotatably mounted upon non-rotatable shaft 12 at a location intermediate the front and rear ends of this shaft. The propeller may be made of a non-rusting metal such as aluminum, or else of a suitable plastic. In either event, the outboard portions of the propeller are bent and configured so as to form suitable blades such that the propeller will readily rotate as the result of the passage of water thereover.

I have found that the propeller rotating in one direction causes the lure to tend to rotate in the same direction, but this is readily counteracted by forming an integral outward extension of the wire used to create the shaft 12, as best seen at 18 in FIG. 1. Upon outward extension 18 is mounted a weight 19, which not only effectively combats the tendency of the lure to rotate, but also causes the lure to move through the water with axis 26 vertical, and at a desired depth. In one particular embodiment, I found that the weight 19 should weigh in the range between ⅛th ounce to 1 ounce, but typically the weight will be in the vicinity of ¼th ounce to ½th ounce, with the ¼ ounce weight usually being sufficient. Quite obviously I am not to be limited to this, for lures made in accordance with this invention can vary widely in size, and therefore have quite different needs.

An operative connection is formed between the propeller 20 and the oscillatory member 30, such that the tail 38 carried by the oscillatory member will be caused to wriggle in a manner closely resembling a swimming fish. A preferred means for providing motion to the tail may include the use of an abutment member 42 located adjacent the rear end of the propeller 20, and member 42 in the embodiment of FIG. 1 is carried on a separate component 43 mounted on the shaft 12. A forward tab 44 on the member 43 assures that the rotation of the propeller will in turn cause rotation of the member 43 and the abutment 42.

Figure 2:
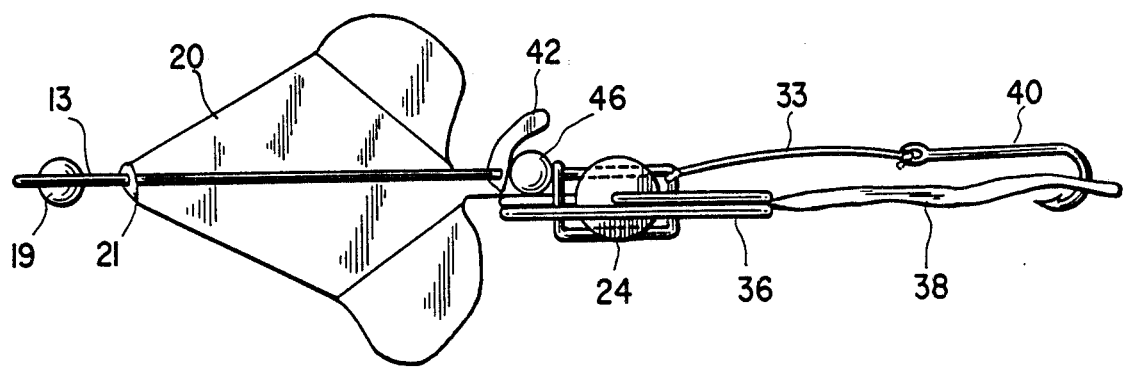
FIG. 2 is a top view of a lure similar to that of FIG. 1 to a slightly larger scale, except that I show here a slightly modified means for interconnecting the rotation producing means with the oscillatory member that releasably carries the tail.
Figure 3:
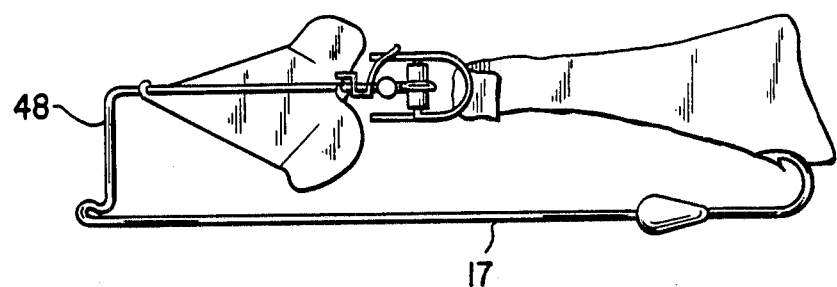
FIG. 3 is a view of an embodiment of my lure in which the fish hook is carried outboard of the lure and tail, rather than being inserted into the tail, with the counterweight utilized to prevent undesired rotation of the principal portion of the lure being utilized near the rear of the lure.

The embodiment of my invention revealed in FIG. 2 is substantially identical to the embodiment of FIG. 1 except that in FIG. 2 the abutment 42 is integral with the propeller 20, and in effect is made out of what was previously the tab 22, except that the abutment 42 here quite obviously is considerably longer than the tab 22 of FIG. 1.

Figure 6:
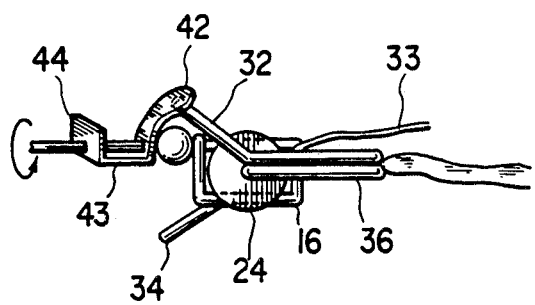
FIG. 6 is a top view of the parts illustrated in FIG. 5, here revealing the angular divergence that may exist in the forwardly extending components of the preferred oscillatory member in accordance with this invention, which angularity may be readily modified by the fisherman in order for him to be able to selectively modify the amplitude of the oscillatory member.

In either instance, the abutment is configured and arranged to have alternate contact with the first and second forwardly extending components 32 and 34 of the oscillatory member, in the general manner depicted in FIGS. 1, 5 and 6. It is to be noted that components 32 and 34 are both located on the opposite side of the perpendicular axis 26 from the tail mounting means 36, and in many instances the forwardly extending members reside in a common vertical plane, or in other words, are coplanar. As will be seen hereinafter, however, the fisherman may wish to move the forwardly extending components out of the coplanar relationship, and establish some angularity therebetween, in order to bring about a deliberate change in the amplitude of oscillation of the oscilatory member 30.

It is to be understood that the oscillatory member 30 is designed to oscillate about the axis 26 illustrated in FIG. 1, with the amplitude of oscillation being able to be controlled by the fisherman by bending the forwardly extending components 32 and 34 in a manner to increase or decrease their angular divergence. This will be discussed at greater length hereinafter.

Figure 4:
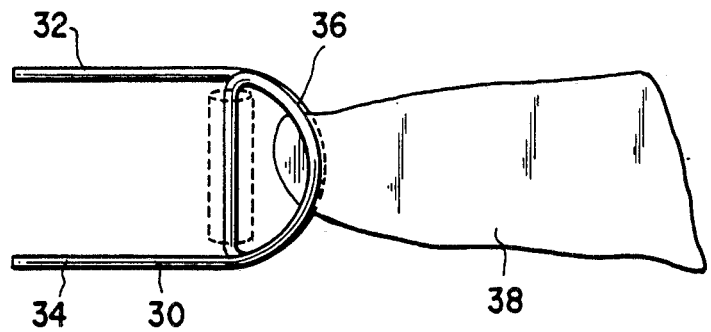
FIG. 4 is a substantially enlarged view of a preferred embodiment of the novel oscillatory member in accordance with this invention, wherein the detachable tail is held by coils formed out of the wire of which this member is constructed.

As best seen in FIG. 4, the oscillatory member 30 of the primary embodiment of my invention may be made of stiff wire bent to form the tail mounting means 36 that serves to detachably support the tail member 38. The construction of the tail mounting means is such that the tail can be clamped firmly enough to prevent loss, yet be readily detachable when taken by a fish. The forwardly extending portions of the same wire form the previously mentioned forwardly extending components 32 and 34 that are alternately contacted by the abutment means 42 during rotation of the propeller 20. In other words, upon the rotating abutment 42 contacting component 32, for example, this causes the oscillatory member 30 to swing in one rotative direction for a limited number of degrees about the vertical axis 26, and as a consequence, the component 34 is caused to move into the rotative path of the abutment 42. Then, upon the abutment 42 thereafter contacting the component 34, the oscillatory member 30 is caused to swing about the vertical axis 26 back in the opposite rotative direction for a limited number of degrees, which places the component 32 in a position to again be contacted by the rotating abutment 42. This sequence of course continues indefinitely, with the result that the member 30 operates in a continuously oscillating fashion as long as water continues to flow over the propeller 20.

The tail mounting means 36 preferably is a form of a spring clamp formed during the bending of the wire to create the oscillatory member 30, and in the preferred embodiment involves two successive coils of wire in close proximity, with the stiffness of the wire causing these coils to lie closely together. To insert the front tip of the tail, the fisherman separates the coils slightly using his fingernail or a thin metal member, places the tip of the tail between the coils, and then permits the natural springiness of the wire coils to clamp the tail tightly, as shown in FIGS. 4 and 5.

Figure 7A:
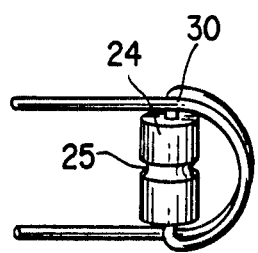
FIGS. 7a and 7b represent additional views revealing the relationship of the forwardly extending components to each other, as well as the support member utilized immediately forward of the coils used to support the detachable tail, which support member also represents the axis of rotation of the oscillatory member.

As is apparent from FIGS. 4 and 5, in the embodiment in which the oscillatory member is made out of bent wire, the support member 24 is in place adjacent the coils of wire during the procedure in which the stiff wire is bent to form the coils of the detachable support means 36. In other words, the wire out of which this embodiment of the oscillatory member is created is threaded through the central longitudinal hole extending through the support 24 before the coils used to clamp the tail are formed. As shown in FIGS. 7a, 8a and 9a, an encircling groove 25 may be created around the mid portion of support 24, in order to provide a location where the turn of wire 13 can reside, thus to prevent slippage thereof away from the desired position.

In FIG. 5 I show the detail involving the stiff wire out of which the shaft member 12 is formed, being bent around the mid portion of the support member 24 to secure these members together, and this view also reveals the use of a bead 46 or the like serving to keep a desired spacing between the rotatable abutment 42, (in this instance being part of component 43) and the twist formed at the rear end 16 of the wire bent around the support 24 to hold the support member 24 in the desired operating position. The desired operating position is of course the position in which the rotational axis 26 represented by the hole through the support 24 is vertical, and essentially perpendicular to the longitudinal axis of the non-rotatable shaft 12.

In FIG. 5 I reveal for the purpose of clarity the member 43 spaced away from the bead 46, but in operation, the rear part of the propeller (or the member 43) is pressed tightly against the bead, and the rear part of the bead in turn is pressed against the twist in the wire. As is apparent, the forwardly extending tab 44 of the member 43 engages the rear of the propeller 20 as revealed in FIG. 1, such that rotation of the propeller as a result of water passing thereover causes the abutment 42 to rotate, and to bring about the oscillation of the oscillatory member 30 by the interaction of the abutment with the forwardly extending members or components 32 and 34.

In FIG. 6 I reveal the typical relationship of the forwardly extending components 32 and 34, as viewed downwardly along the axis through the support 24. In this figure, the member 43 and its abutment 42 are in approximately the correct operative relationship with the forwardly extending components 32 and 34.

One of the very significant advantages of this construction is the ability of the fisherman to readily change the amplitude of the oscillation of the oscillatory member 30 and the tail clamped in the rear portion thereof. If the upper component 32 is directly over the lower component 34, a desirable amount of oscillatory motion of the member 30 and the tail 38 is usually brought about, but if the amount of oscillation, i.e. amplitude of motion of the tail, should in the opinion of the fisherman be decreased, the amount of angularity between members 32 and 34 can be increased in the sense of each of these components being moved in the "retreating" direction away from the rotating abutment member 42. As connoted in FIG. 6, the forwardly extending components reside in a "low amplitude" relationship.

If on the other hand it is for some reason desirable to markedly increase the amount of oscillation, the components 32 and 34 can be bent in the sense of configuring these components to reside in the "advancing" direction toward the rotating abutment member. It should be obvious that the feature involving control of the amplitude of oscillation commends this invention to the use of many fishermen.

As is apparent from FIG. 5, the forward end of the drop line 33 that extends back to the hook 40 (not shown in this figure) is attached at the rear end 16 of the wire 13 wrapped around the midportion of the support 24; note also FIG. 1.

Figure 7B:
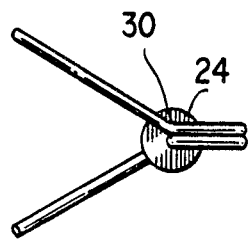

In FIG. 7 I reveal a typical preferred embodiment of the oscillatory member 30, in this instance made of stiff wire of a suitable diameter and suitable hardness. As previously mentioned, the support member 24 I prefer to use is in the nature of a spool having a central longitudinal hole, which of course dictates that the support 24 be threaded onto the wire before the wire is bent in the desired manner.

In FIG. 8 I illustrate an arrangement in which the body portion of the oscillatory member is of plastic, which preferably is molded, but of course, a different procedure may be used in its formation. The body portion 50 may be regarded as being in the form of the letter "Y", wherein the support 24 is carried between the arms 52 and 54 of the Y, being held in the desired location by a short piece of wire extending through a hole in each arm, which holes are in alignment. After the short piece of wire has been threaded through one arm, the support 24 is inserted, and then the wire is passed through the hole in the other arm.

Thereafter, the wire is bent into a U shape, such that the two ends of the wire extend forwardly to define the forwardly extending components 32 and 34. Support for the forwardly extending wires is supplied by notches 56 and 58 formed on the outer portions of the plastic arms 52 and 54, respectively; note FIG. 8. As is obvious, the forwardly extending components may be selectively bent to control the amplitude of oscillation, in the same manner as described in the previous embodiment.

The portion 60 of the plastic oscillatory member 50 corresponding to the lower leg of the figure Y represents the means by which the detachable tail is held in a desirable manner, and as is visible in FIG. 8a as well as FIG. 8b, the tail holding means 66 is formed by slotting the leg portion 60 of the Y shaped member to create two halves. This in effect causes a configuration in the form of a one-piece, old fashioned (springless) clothespin to be defined, wherein the two parts of the tail holding means 66 can be sprung apart to some extent against the natural resilience of the plastic, the forward end of the tail inserted, and the two parts permitted to spring back and clasp the tail. This is the full counterpart of the tail holding means depicted in FIGS. 7a and 7b and certain earlier figures, wherein closely residing coils form the means for clasping the forward end of the tail member. I have found that this form of tail support using plastic is quite satisfactory for clamping and supporting many different types of tails.

In FIGS. 9a and 9b I reveal an oscillatory member wherein the forwardly extending components that interact with the abutment 42 are preferably of plastic instead of wire. This is another way of saying that this plastic member 70 is of Y shape wherein the arms 72 and 74 of this Y are considerably longer than were the plastic arm portions in the embodiment revealed in FIGS. 8a and 8b. As a matter of fact, the plastic body member 70 of FIGS. 9a and 9b bears a distinct resemblance to a tuning fork, but of course a tuning fork is made of metal, whereas this member may be made of plastic or of any other suitable material, whether metallic or non-metallic.

As in the case of the embodiment of FIGS. 8a and 8b, the leg portion of the device of FIGS. 9a and 9b is preferably of plastic, with the leg being split to create a tail holding device in the nature of the old fashioned one piece springless clothespin previously mentioned. Wire is used to hold the support member 24 in the correct operative position, as was the case in the embodiment of FIG. 8a, except that here the wire is much shorter. The upper end of the wire is bent to prevent it slipping out of the proper operative relationship with the plastic member, whereas the lower end of the wire is lengthened and configured to support the weight 76. When the weight is used in the manner shown in FIG. 9a, it makes it unnecessary to use the weight used forwardly, as was shown in FIG. 1. Often it is not advantageous to use the aft mounted weight, as depicted in FIG. 9a, for with some forms of tails, the tail may tend to become fouled in the propeller.

In FIGS. 10a and 10b I reveal an embodiment wherein the body member 80 is made of a flat strip of metal or plastic approximately one fourth inch wide, and bent such that one half overlays the other half, and with 90° bends at the forwardmost portions. A notch 86 is formed in the upper bend, and a notch 88 is formed in the lower bend, as best seen in FIG. 10a. In these notches lie the forwardly extending arms of wire representing the forwardly extending components 82 and 84 that are contacted by the rotating abutment 42. As is obvious, the short wire member extends through the upper and lower halves of the body member, as was generally the case in FIG. 8a, except in this instance it is usually unnecessary to insert a support member 24. Rather, the wire member 13 extending aft from the propeller shaft portion has a 180° bend to form a loop 90, with the end of the wire 13 then extending forwardly to a location approximately under the midpoint of the forwardly extending wire components 82 and 84. A 90° bend 92 in the wire at this location acts as a blocker to prevent the bead from moving aft to an undesired location. As is obvious, the 90° bend and the bead prevent the propeller and the abutment 42 from moving so far aft that the abutment 42 would not have a proper interaction with the forwardly extending components 82 and 84 of the oscillatory member 80.

It should be noted that the loop 90 may be regarded as passing around the short length of wire used to form the forwardly extending components 82 and 84, at the location where latter wire passes through the interior of body member 80, thus forming a wire-to-wire contact with the wire of loop 90.

As visible in FIGS. 10a and 10b, the rearwardmost portion of the body member 80 is provided with a vertical slot in which the detachable tail is mounted, this being the mounting means 96. As in the case of the wire and plastic embodiments previously discussed, the mounting means here are spread apart against the natural resilience of the material by the fisherman, the front end of the tail inserted, and then the portions permitted to spring back into the clamping position.

As earlier mentioned, by the several embodiments of this invention teaching a means for detachably holding the tail, the stress of a struggling fish is not transmitted to the oscillatory member, for the tail is designed to separate from the oscillatory means as soon as the fish is hooked. As a result of this advantageous construction, it is possible to utilize lightweight materials in creating the lure, which in turn makes it possible for the lure to accurately simulate the undulating motion of a baitfish as it swims through the water.

Because the force presented by the hooked fish is transmitted to the aft end of the wire wrapped around the support member 24, the stress presented by the struggles of the fish is directly transmitted to the aft end of the wire forming the propeller shaft, which of course means that the oscillatory member is able to remain in proper adjustment, and because it is not deformed as a consequence of the struggles of the fish, it can be reused many times and with many different tails.

I claim:

1. A lightweight fishing lure comprising an elongate, non-rotative shaft having an attachment means for a fishline at its front end, and a support for an oscillatory member at its rear end, said oscillatory member having tail mounting means serving to detachably mount a tail, said support defining an axis essentially perpendicular to the axis of said elongate shaft, said oscillatory member being rotatable for a number of degrees in each direction about said perpendicular axis, motion producing means mounted on said elongate shaft at a location intermediate said ends, and means forming an operative connection between said motion producing means and said oscillatory member, so that a tail mounted on said tail mounting means of said oscillatory member will be caused to undertake a motion closely resembling that of a swimming fish.

2. The lightweight fishing lure as recited in claim 1 in which said motion producing means includes the use of a propeller caused to rotate by the passage of water thereover.

3. The lightweight fishing lure as recited in claim 2 in which the operative connection between said propeller and said oscillatory member includes a radially extending abutment member driven in rotation by said propeller, which abutment member makes alternate contact with first and second, spaced apart, forwardly extending components of said oscillatory member.

4. The lightweight fishing lure as defined in claim 3 in which said radially extending abutment member is an integral part of said propeller.

5. The lightweight fishing lure as defined in claim 3 in which said radially extending abutment member is mounted on said non rotative shaft as a member separate from said propeller.

6. The lightweight fishing lure as recited in claim 1 in which said oscillatory member is formed of bent wire.

7. The lightweight fishing lure as recited in claim 6 in which forwardly extending components of said oscillatory member are utilized, which components operatively interact with said motion producing means.

8. The lightweight fishing lure as recited in claim 7 in which the extent of oscillation of said tail can be readily modified by bending said forwardly extending components to change the angular relationship therebetween.

9. The lightweight fishing lure as recited in claim 1 in which said oscillatory member is principally formed of plastic.

10. The lightweight fishing lure as recited in claim 1 in which said oscillatory member is principally formed of plastic, but has forwardly extending components made of wire that are placed to operatively interact with said motion producing means.

11. The lightweight fishing lure as recited in claim 10 in which the extent of oscillation of said tail can be established by bending said forwardly extending components to change the angular relationship therebetween.

12. The lightweight fishing lure as defined in claim 1 in which said tail mounting means is configured to readily release the tail upon being taken by a fish.

13. The lightweight fishing lure as recited in claim 1 in which said oscillatory member is principally formed of a metallic material.

14. The lightweight fishing lure as defined in claim 1 in which the principal portion of said lure is prevented by a weight located outboard of said propeller from tending to rotate as a result of water passing over said propeller.

15. The lightweight fishing lure as recited in claim 13 in which said weight is located on a forward portion of said lure.

16. The lightweight fishing lure as recited in claim 13 in which said weight is located on a rearward portion of said lure.

17. A lightweight fishing lure utilizing an oscillatable, releasable tail, comprising an elongate, non-rotatable shaft having forward, mid and rearward portions, said shaft having a fishline attachment means at its forward portion, a propeller freely rotatable by the flow of water thereover located at its mid-portion, and a rotation-permitting support on its rearward portion, said propeller having at least one radially extending abutment member located adjacent its rear end, which abutment member is caused to rotate with the propeller, said rotation-permitting support itself normally being non-rotatable and defining means accommodating an oscillatory member rotatable for a number of degrees in each direction about an axis of rotation essentially perpendicular to the centerline of said shaft, said oscillatory member having tail mounting means located aft of said perpendicular axis, such that the tail can readily detach upon being taken by a fish, and first and second forwardly extending components located forward of said perpendicular axis, said abutment member being placed so as to contact one of said forwardly extending components during the first half of each rotative cycle of said propeller, and to contact the other of said forwardly extending components during the second half of each rotative cycle of said propeller, whereby a tail mounted in said tail mounting means is caused to oscillate back and forth in a manner closely resembling that of a fish, as said lightweight fishing lure moves through the water and said propeller is caused to rotate, and means for preventing the portion of said lure involving said support from rotating as it passes through the water.

18. The lightweight lure as recited in claim 17 in which said means for preventing rotation of said support involves a weight located outboard of the axis of rotation of said propeller.

19. A lightweight fishing lure having an elongate, non-rotatable shaft upon the front end of which is an attachment point for a fishline, and upon the rear end of which is a mounting means for an oscillatory member designed to oscillate about an axis essentially perpendicular to the centerline of said shaft, said oscillatory member having portions extending both fore and aft of said perpendicular axis, with the portion forward of latter axis entailing a pair of spaced, forwardly extending members, and the portion aft of said perpendicular axis having means upon which a detachable tail may be mounted for oscillatory movement, the portion of said non-rotatable shaft located between its front and rear ends forming the location at which a freely rotatable propeller is located, which propeller is designed to rotate as a result of water passing thereover, a radial abutment located adjacent the rear of said propeller and placed so as to contact in turn, each of said forwardly extending components, with one of such components being contacted during the first half of each rotative cycle of said propeller, and the other of such components being contacted during the second half of each rotative cycle, the contact of said radial abutment with each of said forwardly extending components causing said tail support to move first in one direction and thereafter in the other, thus to cause a detachable tail to oscillate in a manner closely resembling that of a swimming fish.

20. The lightweight lure as recited in claim 19 in which means are utilized for preventing the principal portion of said lure from rotating during movement through the water, said means being a weight mounted outboard of the axis of rotation of said propeller.

* * * * *